(12) United States Patent
Wang et al.

(10) Patent No.: US 12,058,083 B2
(45) Date of Patent: Aug. 6, 2024

(54) CAPACITIVE HYBRID WITH PGA FOR FULL DUPLEX TRANSCEIVERS

(71) Applicant: Avago Technologies International Sales Pte. Limited, Singapore (SG)

(72) Inventors: Jingguang Wang, Irvine, CA (US); Kambiz Vakilian, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 493 days.

(21) Appl. No.: 17/152,369

(22) Filed: Jan. 19, 2021

(65) Prior Publication Data

US 2022/0150041 A1 May 12, 2022

Related U.S. Application Data

(60) Provisional application No. 63/112,933, filed on Nov. 12, 2020.

(51) Int. Cl.
*H04L 5/14* (2006.01)
*H04B 1/403* (2015.01)

(52) U.S. Cl.
CPC ........ *H04L 5/1415* (2013.01); *H04B 1/406* (2013.01); *H04L 5/1423* (2013.01)

(58) Field of Classification Search
CPC ....... H04L 5/1415; H04L 5/1423; H04L 5/14; H04L 5/143; H04L 5/1469; H04L 5/1461; H04L 2012/6491; H04B 1/406; H04B 1/40; H04B 1/50; H04B 1/52; H04B 1/525; H04B 1/58; H04B 3/03

See application file for complete search history.

(56) References Cited

U.S. PATENT DOCUMENTS

| | | | | | |
|---|---|---|---|---|---|
| 4,064,377 A | * | 12/1977 | Regan | .................. | H04M 1/585 379/345 |
| 4,598,396 A | * | 7/1986 | Upp | ....................... | H04B 3/548 370/284 |
| 5,740,241 A | * | 4/1998 | Koenig | ............... | H04M 7/0096 379/398 |
| 5,896,420 A | * | 4/1999 | Kaku | ...................... | H04L 5/18 379/406.06 |

(Continued)

FOREIGN PATENT DOCUMENTS

EP   3 367 580   8/2018

OTHER PUBLICATIONS

Extended EP Search Report on EP 21201828.7 mailed on Mar. 25, 2022 (10 pages).

*Primary Examiner* — James M Perez
(74) *Attorney, Agent, or Firm* — Foley & Lardner LLP

(57) ABSTRACT

Disclosed herein are implementations of a hybrid network for use in a full duplex communication system. In one aspect, the hybrid network includes a first circuit coupled between an output of a communication channel and a shared output of a transmitter and the communication channel, a second circuit coupled between a first output of the transmitter and the shared output, a third circuit coupled between the shared output and an input of an amplifier, a fourth circuit coupled between the input of the amplifier and a second output of the transmitter, and a fifth circuit coupled between an output of the amplifier and the input of the amplifier. In some embodiments, the output of the amplifier is coupled to an input of a receiver.

23 Claims, 8 Drawing Sheets

(56) References Cited

U.S. PATENT DOCUMENTS

| | | | | |
|---|---|---|---|---|
| 5,953,412 | A * | 9/1999 | Sheets | H04B 1/586 379/414 |
| 5,963,638 | A * | 10/1999 | Sheets | H04B 1/586 379/345 |
| 6,208,732 | B1 * | 3/2001 | Moschytz | H04B 1/586 379/398 |
| 6,226,322 | B1 * | 5/2001 | Mukherjee | H04L 25/03878 375/233 |
| 6,226,331 | B1 * | 5/2001 | Gambuzza | H04L 25/0266 375/220 |
| 6,259,745 | B1 * | 7/2001 | Chan | H04B 3/32 370/294 |
| 6,298,046 | B1 * | 10/2001 | Thiele | H04L 1/22 379/403 |
| 6,343,024 | B1 * | 1/2002 | Zabroda | H04L 25/0266 323/208 |
| 6,393,110 | B1 * | 5/2002 | Price | H04M 1/76 379/406.01 |
| 6,445,791 | B1 * | 9/2002 | Grisamore | H04L 25/0266 379/406.01 |
| 6,466,088 | B1 * | 10/2002 | Rezvani | H04L 12/10 330/136 |
| 6,566,957 | B1 * | 5/2003 | Caine | H04L 25/028 330/296 |
| 6,583,662 | B1 * | 6/2003 | Lim | H03K 5/1252 327/558 |
| 6,618,480 | B1 * | 9/2003 | Polley | H04B 3/23 379/406.05 |
| 6,643,271 | B1 * | 11/2003 | Henri | H04B 3/23 379/406.01 |
| 6,735,302 | B1 * | 5/2004 | Caine | H04M 19/005 379/404 |
| 6,748,076 | B1 * | 6/2004 | Elo | H03H 11/34 379/93.05 |
| 6,751,202 | B1 * | 6/2004 | Henrie | H04B 3/23 379/345 |
| 6,751,315 | B1 * | 6/2004 | Liu | H04M 19/00 370/488 |
| 6,757,383 | B1 * | 6/2004 | Joffe | H04B 3/03 379/406.01 |
| 6,760,434 | B1 * | 7/2004 | Rezvani | H04L 27/0002 379/398 |
| 6,801,621 | B1 * | 10/2004 | Tennen | H04L 25/0298 379/345 |
| 6,804,348 | B1 * | 10/2004 | Chaplik | H04L 5/1461 379/93.08 |
| 6,816,004 | B2 * | 11/2004 | Easwaran | H04L 5/1461 327/552 |
| 6,831,976 | B1 * | 12/2004 | Comerford | H04M 19/08 379/413 |
| 6,947,478 | B1 * | 9/2005 | Hauptmann | H04B 3/23 379/406.01 |
| 6,956,944 | B1 * | 10/2005 | Koren | H04B 3/23 379/406.01 |
| 6,980,644 | B1 * | 12/2005 | Sallaway | H04M 9/082 379/406.01 |
| 7,010,025 | B1 * | 3/2006 | Helfenstein | H04B 3/03 343/822 |
| 7,072,476 | B2 * | 7/2006 | White | H04R 5/033 381/328 |
| 7,139,342 | B1 * | 11/2006 | Phanse | H04B 3/23 375/350 |
| 7,212,627 | B2 * | 5/2007 | Choksi | H04M 3/002 379/398 |
| 7,457,258 | B2 * | 11/2008 | Stetson | H04B 3/20 370/286 |
| 8,363,535 | B2 * | 1/2013 | Parnaby | H04B 3/23 370/287 |
| 8,467,739 | B2 * | 6/2013 | Vajha | H03D 7/1475 455/75 |
| 8,537,728 | B2 * | 9/2013 | Huang | H04B 3/23 375/346 |
| 8,897,178 | B2 * | 11/2014 | Devuyst | H04L 25/028 370/230.1 |
| 9,419,779 | B2 * | 8/2016 | Pan | H04B 3/23 |
| 9,614,575 | B2 * | 4/2017 | Gomez | H03F 3/211 |
| 9,749,119 | B2 * | 8/2017 | Mikhemar | H04B 1/525 |
| 10,021,652 | B2 * | 7/2018 | Gossner | H04B 1/40 |
| 10,141,891 | B2 * | 11/2018 | Gomez | H03F 3/45183 |
| 10,200,076 | B1 * | 2/2019 | Choi | H04L 5/1461 |
| 10,425,115 | B2 * | 9/2019 | Hahn | H04B 1/40 |
| 10,644,863 | B2 * | 5/2020 | Lin | H04B 3/235 |
| 10,658,979 | B2 * | 5/2020 | Gomez | H03F 1/0227 |
| 11,171,740 | B2 * | 11/2021 | Huang | H04L 1/0021 |
| 2001/0045843 | A1 * | 11/2001 | Hernandez-Marti | H03H 11/30 326/30 |
| 2002/0063650 | A1 * | 5/2002 | John | H03M 3/324 341/172 |
| 2002/0136321 | A1 * | 9/2002 | Chan | H04B 3/23 375/295 |
| 2002/0151280 | A1 * | 10/2002 | Sabouri | H04L 27/0002 455/121 |
| 2002/0168064 | A1 * | 11/2002 | Pollet | H04B 1/582 379/394 |
| 2002/0172329 | A1 * | 11/2002 | Rashid-Farrokhi | H04B 3/46 324/533 |
| 2002/0176569 | A1 * | 11/2002 | Casier | H04B 1/583 379/402 |
| 2003/0012288 | A1 * | 1/2003 | Zhou | H04B 3/23 375/316 |
| 2003/0012364 | A1 * | 1/2003 | Lee | H04L 27/0002 379/402 |
| 2003/0081761 | A1 * | 5/2003 | Schley-May | H04M 1/76 379/398 |
| 2003/0109239 | A1 * | 6/2003 | Sabouri | H04L 25/0278 455/307 |
| 2003/0112860 | A1 * | 6/2003 | Erdogan | H04L 25/03006 375/229 |
| 2003/0112966 | A1 * | 6/2003 | Halder | H04B 3/23 379/406.05 |
| 2003/0123650 | A1 * | 7/2003 | Ouyang | H04B 3/03 379/406.01 |
| 2003/0142688 | A1 * | 7/2003 | Chou | H04B 3/32 370/420 |
| 2003/0169875 | A1 * | 9/2003 | Lee | H04M 3/007 379/399.01 |
| 2003/0202570 | A1 * | 10/2003 | Bella | H04L 25/03834 375/222 |
| 2004/0032911 | A1 * | 2/2004 | Wu | H04L 27/2647 375/285 |
| 2004/0037352 | A1 * | 2/2004 | Gough | H04L 27/0002 375/222 |
| 2004/0066226 | A1 * | 4/2004 | Easwaran | H03H 11/1217 327/552 |
| 2005/0046475 | A1 * | 3/2005 | Sobel | H03F 3/087 330/69 |
| 2005/0099966 | A1 * | 5/2005 | Huang | H04B 3/23 370/286 |
| 2005/0141440 | A1 * | 6/2005 | Stetson | H04B 3/03 370/269 |
| 2005/0179473 | A1 * | 8/2005 | Nagahori | H04L 5/1423 327/110 |
| 2005/0232170 | A1 * | 10/2005 | Chiu | H04L 5/1461 370/276 |
| 2006/0018388 | A1 * | 1/2006 | Chan | H04L 25/085 375/257 |
| 2006/0062378 | A1 * | 3/2006 | Choksi | H04M 3/002 379/399.01 |
| 2006/0222173 | A1 * | 10/2006 | Lin | H04B 3/23 379/406.01 |
| 2008/0151787 | A1 * | 6/2008 | Lin | H04B 3/03 370/276 |
| 2010/0142699 | A1 * | 6/2010 | Qin | H04B 1/58 379/402 |
| 2010/0208577 | A1 * | 8/2010 | Huang | H04B 3/23 370/201 |
| 2011/0044415 | A1 * | 2/2011 | Muralt | H04B 3/03 375/350 |

(56) References Cited

U.S. PATENT DOCUMENTS

| | | | |
|---|---|---|---|
| 2012/0170735 A1* | 7/2012 | Huang | H04B 3/238 |
| | | | 379/406.1 |
| 2014/0010356 A1* | 1/2014 | Li | H04B 3/21 |
| | | | 379/406.1 |
| 2014/0269449 A1* | 9/2014 | Abramsky | H04L 5/14 |
| | | | 370/278 |
| 2015/0071136 A1* | 3/2015 | Pan | H04B 3/23 |
| | | | 370/282 |
| 2015/0103986 A1* | 4/2015 | Chen | H04B 3/20 |
| | | | 379/93.05 |
| 2017/0085359 A1* | 3/2017 | Wu | H04L 5/1461 |
| 2017/0237506 A1* | 8/2017 | Soto | H04B 10/00 |
| | | | 398/116 |
| 2018/0152898 A1* | 5/2018 | Gossner | H04B 1/18 |
| 2020/0313704 A1* | 10/2020 | Strackx | H04L 25/0272 |
| 2021/0028819 A1* | 1/2021 | Huang | H04B 3/20 |
| 2022/0150041 A1* | 5/2022 | Wang | H04L 5/1415 |
| 2022/0329359 A1* | 10/2022 | Korpi | H04L 1/1812 |

* cited by examiner

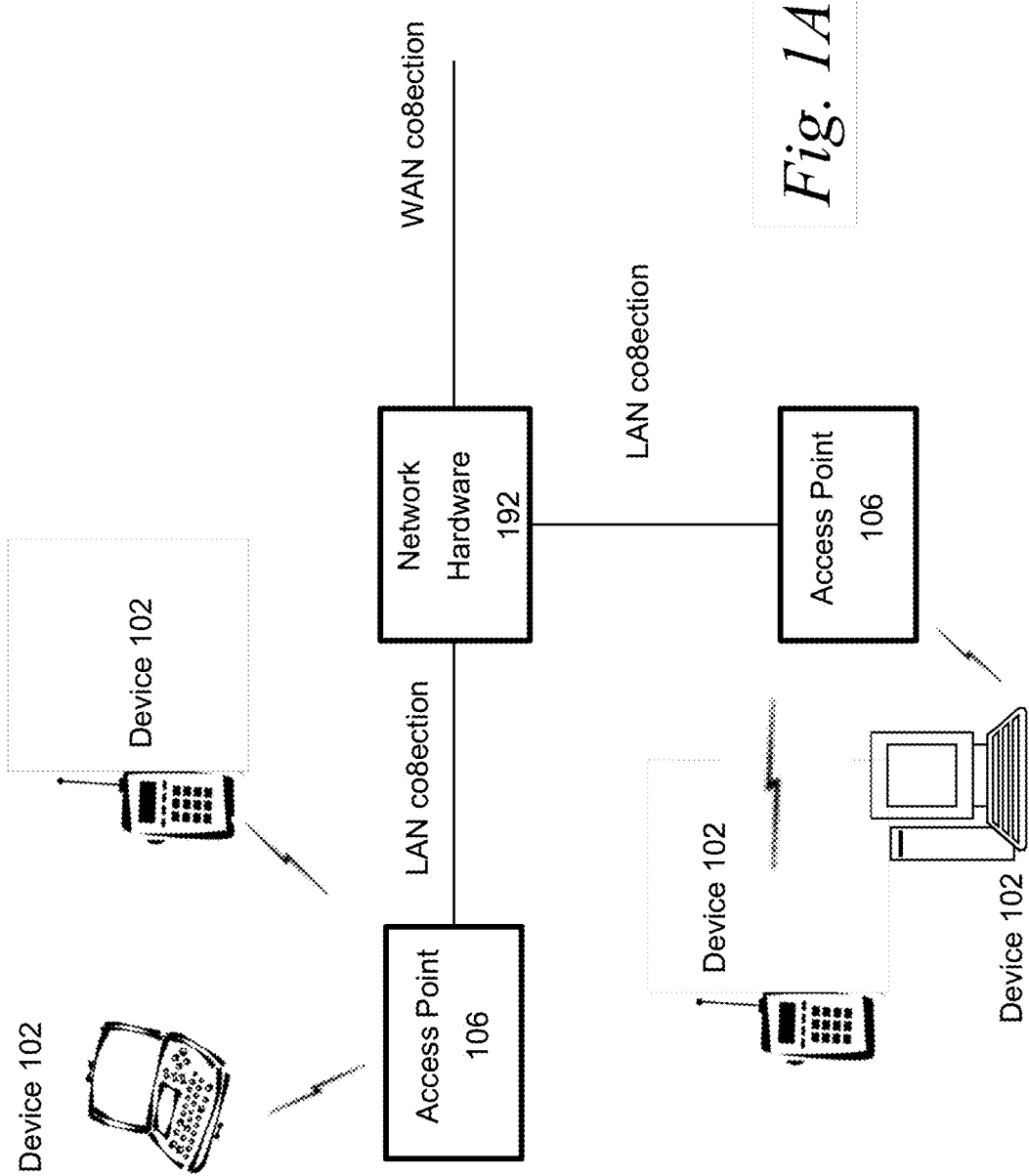

CAPACITIVE HYBRID WITH PGA FOR FULL DUPLEX TRANSCEIVERS

CROSS-REFERENCE TO RELATED APPLICATION

This application claims the benefit of and priority under 35 U.S. § 119(e) to U.S. Provisional Patent Application No. 63/112,933, filed Nov. 12, 2020, titled "CAPACITIVE HYBRID WITH PGA FOR FULL DUPLEX TRANSCEIVERS," which is incorporated by reference in its entirety for all purposes.

FIELD OF THE DISCLOSURE

This disclosure generally relates to a communication system, including but not limited to hybrid circuits for full duplex transceivers.

BACKGROUND OF THE DISCLOSURE

A duplex communication system may a point-to-point system of two or more connected parties or devices that can communicate with one another in both directions. Duplex systems can be employed in many communications networks, either to allow for simultaneous communication in both directions between two connected parties or to provide a reverse path for the monitoring and remote adjustment of equipment in the field.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1A is a block diagram depicting a network environment including one or more access points in communication with one or more devices or stations, in one or more embodiments.

The details of various embodiments of the methods and systems are set forth in the accompanying drawings and the description below.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods of a capacitive hybrid with a PGA for full duplex transceivers, according to one or more embodiments.

A. Computing and Network Environment

Figure 1B:
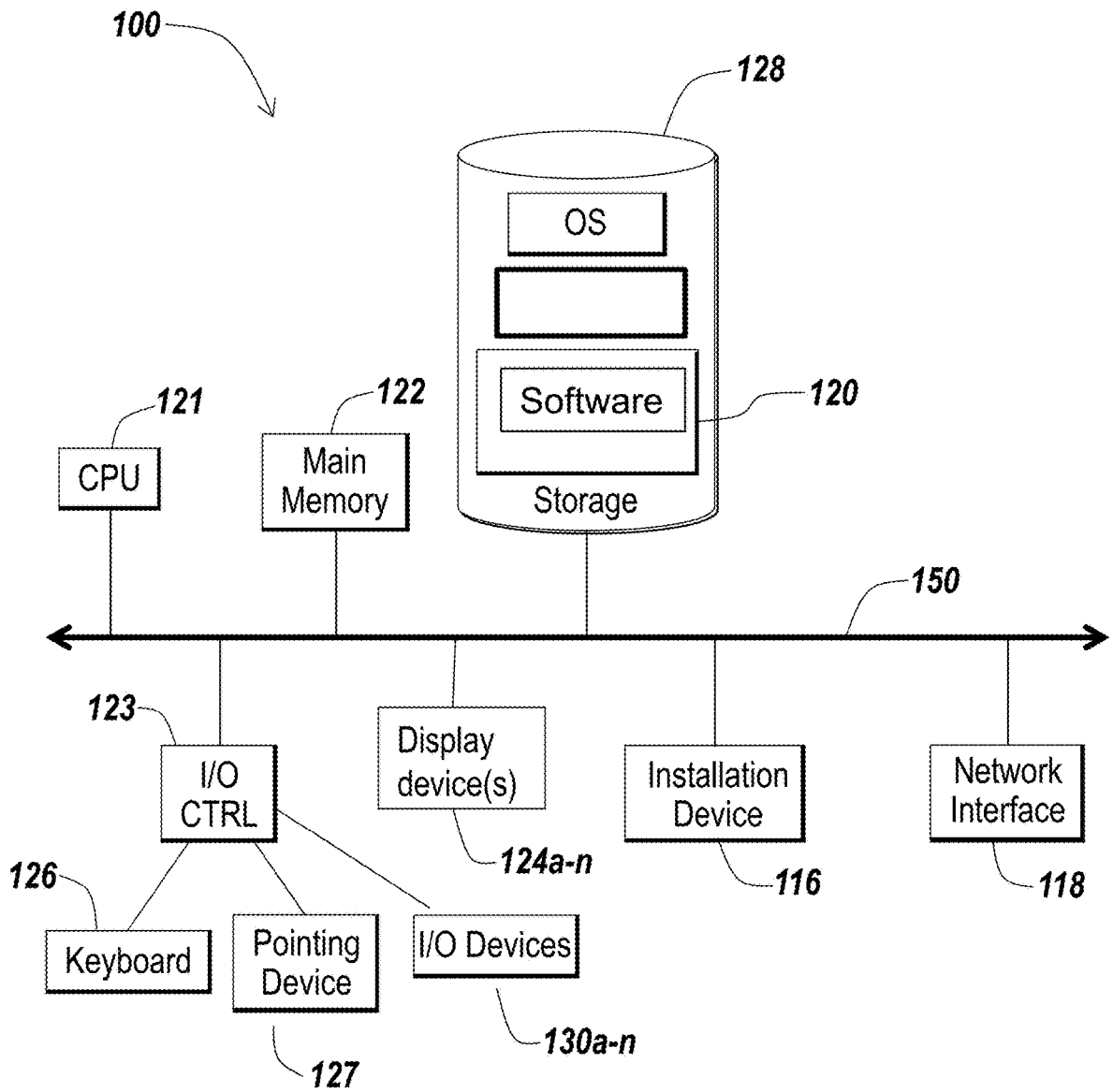
FIGS. 1B and 1C are block diagrams depicting computing devices useful in connection with the methods and systems described herein, in one or more embodiments.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, Internet of Things (IoT) devices 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc. in one embodiment. The APs 106 can be operably coupled to the network hardware component 192 via local area network connections. The network hardware component 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as an wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the APs 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or APs 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more APs 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1C:
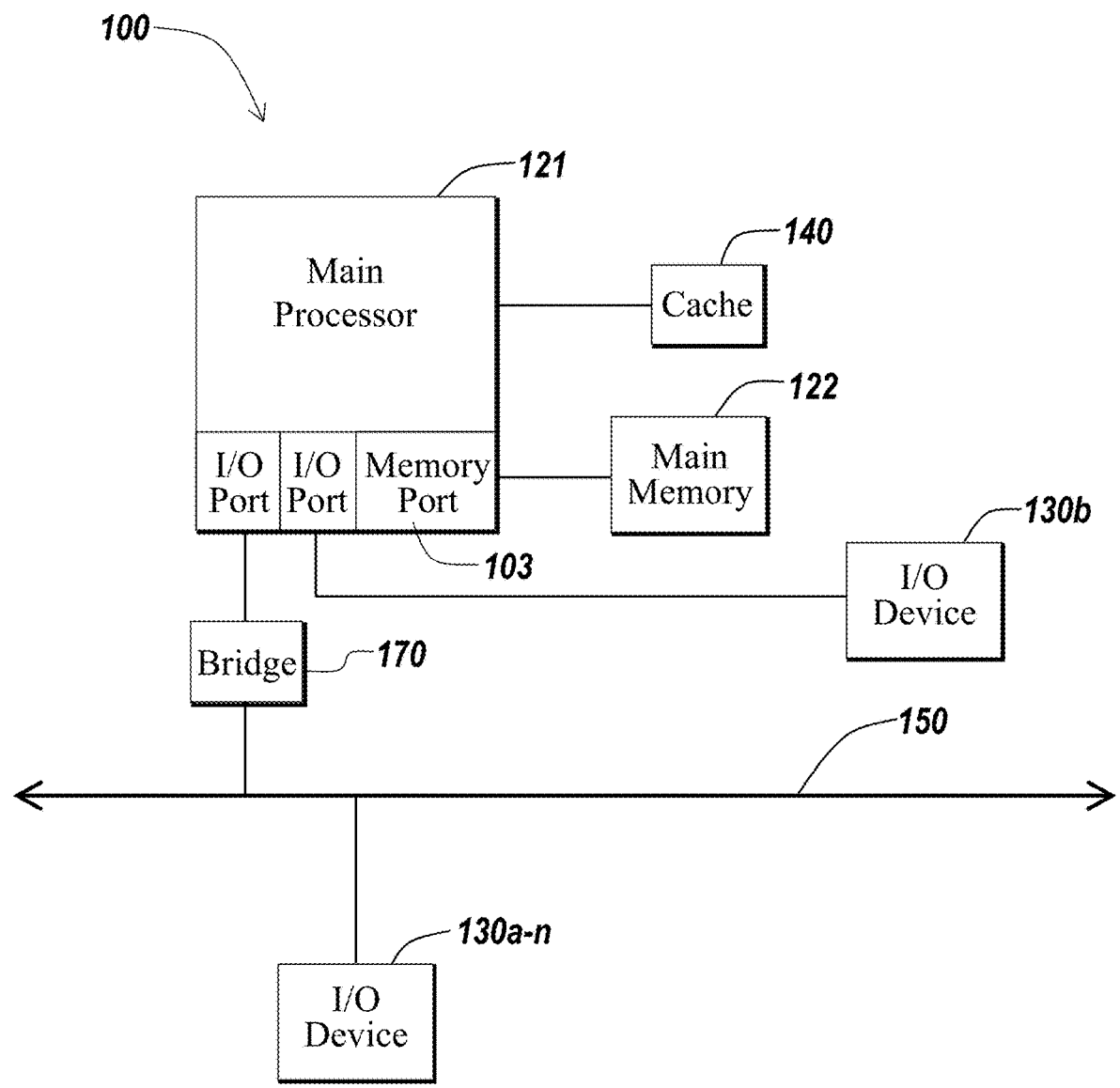

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California The computing device 100 can be based on any of these processors, or any other processor (e.g., integrated digital signal processor (DSP)) capable of operating as described herein.

Main memory unit 122 can be one or more memory chips capable of storing data and allowing any storage location to be directly accessed by the microprocessor or central processing unit 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor or central processing unit 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor or central processing unit 121 communicates directly with cache memory 140 via a secondary bus, sometimes referred to as a backside bus. In other embodiments, the main processor or central processing unit 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor or central processing unit 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor or central processing unit 121 can use an Advanced Graphics Port (AGP) to communicate with the display 124. FIG. 1C depicts an embodiment of a computer device 100 in which the main processor or central processing unit 121 can communicate directly with I/O device 130b, for example via HYPERTRANSPORT, RAPIDIO, or INFINIBAND communications technology. FIG. 1C also depicts an embodiment in which local busses and direct communication are mixed: the processor or central processing unit 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium or installation device 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, California Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, IEEE 802.11ax, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Capacitive Hybrid with PGA for Full Duplex Transceivers

Various embodiments disclosed herein are related to a hybrid circuit in combination with a feedback amplifier that can remove a transmit signal and amplify a received signal as one function. In a full duplex transceiver (e.g., for Ethernet communication), transmitter (TX) and receiver (RX) circuits of the transceiver may share one or more transceiver ports/terminations, such as Media Dependent Interface (MDI) pins. In some embodiments, the one or more transceiver ports are connected to a second one or more transceiver ports (e.g., link partner MDI pins) of a second transceiver through a network (e.g., an Ethernet cable). Since both local TX and RX signals are combined at the transceiver ports, a hybrid circuit may be needed to remove or nullify the TX signal and deliver the RX signal to the receiver without interference from the TX signal.

Systems lacking the improved hybrid implementations discussed herein may load the transceiver ports, cause loss of the RX signal, and add noise (e.g., thermal noise) to degrade signal-to-noise ratio (SNR) of the received channel. For example, some such systems include resistor networks without a feedback amplifier. The non-feedback, resistor network implementation may have resistive loading at the transceiver ports which may reduce an amplitude of the TX signal. The resistor at the receiver input may generate noise. Decreasing a value of the resistors may reduce noise, but at the same time, may increase the resistive loading, which may be an unfavorable trade-off. Such implementations may incur additional RX signal loss due to the RX signal flowing through the resistor network used to cancel the TX signal. Accordingly, only a fraction of the RX signal may be received at the RX input.

Embodiments disclosed herein include a capacitor network coupled to an inverting programmable gain amplifier (PGA) with capacitors in feedback that can remove the TX signal and amplify the RX signal. Embodiments disclosed herein can cancel the TX signal at the input of the PGA using a ratio of capacitance values. Moreover, embodiments disclosed herein may leverage a virtual ground at an input of the feedback-configured PGA to not waste RX signal in the hybrid network.

Advantageously, the combination of the capacitor hybrid and the capacitive feedback PGA may eliminate receiver signal loss in the hybrid. The capacitor network may not generate additional noise. Accordingly, a capacitance value of the capacitor can be reduced to reduce a loading effect to the transceiver ports without suffering noise degradation. In addition, embodiments disclosed herein can improve the RX SNR.

Various embodiments disclosed herein are related to a hybrid network for use in a full duplex communication system. In some embodiments, the hybrid network includes a first circuit coupled between an output of a communication channel and a shared output of a transmitter and the communication channel, a second circuit coupled between a first output of the transmitter and the shared output, a third circuit coupled between the shared output and an input of an amplifier, a fourth circuit coupled between the input of the amplifier and a second output of the transmitter, and a fifth circuit coupled between an output of the amplifier and the input of the amplifier. In some embodiments, the output of the amplifier is coupled to an input of a receiver.

In some embodiments, the hybrid network is configured to provide, to the receiver, a receive signal provided by the output of the communication channel and cancel a first transmit signal provided by the first output of the transmitter with a second transmit signal provided by the second output of the transmitter. In some embodiments, the fifth circuit includes a first capacitor.

In some embodiments, the third circuit includes a first capacitor having a first capacitance, and the fourth circuit includes a second capacitor having a second capacitance. In some embodiments, a ratio of the first capacitance and the second capacitance is configured to cancel a first transmit signal provided by the first output of the transmitter with a second transmit signal provided by the second output of the transmitter.

In some embodiments, the second circuit includes a first resistor having a first resistance and coupled to the first capacitor and the fourth circuit includes a second resistor having a second resistance and coupled to the second capacitor. In some embodiments, a second ratio of the first resistance and the second resistance is configured to cancel a first transmit signal provided by the first output of the transmitter with a second transmit signal provided by the second output of the transmitter.

In some embodiments, the fourth circuit includes a tunable capacitor coupled at one end between the second capacitor and the second resistor and coupled at a second end to a ground. In some embodiments, the first circuit includes a third resistor having a third resistance equal to the first resistance, and coupled to the first capacitor. In some embodiments, the fifth circuit includes a first resistor.

In some embodiments, the third circuit includes a first resistor having a first resistance and the fourth circuit includes a second resistor having a second resistance. In some embodiments, a ratio of the first resistance and the second resistance is configured to cancel a first transmit signal provided by the first output of the transmitter with a second transmit signal provided by the second output of the transmitter.

In some embodiments, the hybrid network further includes an sixth circuit coupled between a second shared output and a second input of the amplifier and a seventh circuit coupled between the second input of the amplifier and the first output of the transmitter. In some embodiments, the sixth circuit includes a third capacitor and the fourth circuit includes a fourth capacitor.

Various embodiments disclosed herein are related to a hybrid network for use in a full duplex communication system. In some embodiments, the hybrid network includes a first circuit coupled between a first output of a transmitter and a shared output of the transmitter and a communication channel, a second circuit coupled between the shared output and an input of an amplifier. In some embodiments, the second circuit includes a first capacitor. In some embodiments, the hybrid network includes a third circuit coupled between the input of the amplifier and a second output of the transmitter. In some embodiments, the third circuit includes a second capacitor. In some embodiments, the hybrid network includes a fourth circuit coupled between an output of the amplifier and the input of the amplifier. In some embodiments, the output of the amplifier is coupled to a receiver.

In some embodiments, the hybrid network is configured to provide, to the receiver, a receive signal provided the communication channel and cancel a first transmit signal provided by the first output of the transmitter with a second transmit signal provided by the second output of the transmitter. In some embodiments, the fourth circuit includes a third capacitor.

In some embodiments, the first capacitor has a first capacitance and the second capacitor has a second capacitance. In some embodiments, a ratio of the first capacitance and the second capacitance is configured to cancel a first transmit signal provided by the first output of the transmitter with a second transmit signal provided by the second output of the transmitter. In some embodiments, the first circuit includes a first resistor having a first resistance and coupled to the first capacitor and the third circuit includes a second resistor having a second resistance and coupled to the second capacitor.

In some embodiments, a second ratio of the first resistance and the second resistance is configured to cancel a first transmit signal provided by the first output of the transmitter with a second transmit signal provided by the second output of the transmitter. In some embodiments, the third circuit includes a tunable capacitor coupled at one end between the second capacitor and the second resistor and coupled at a second end to ground.

Figure 2:
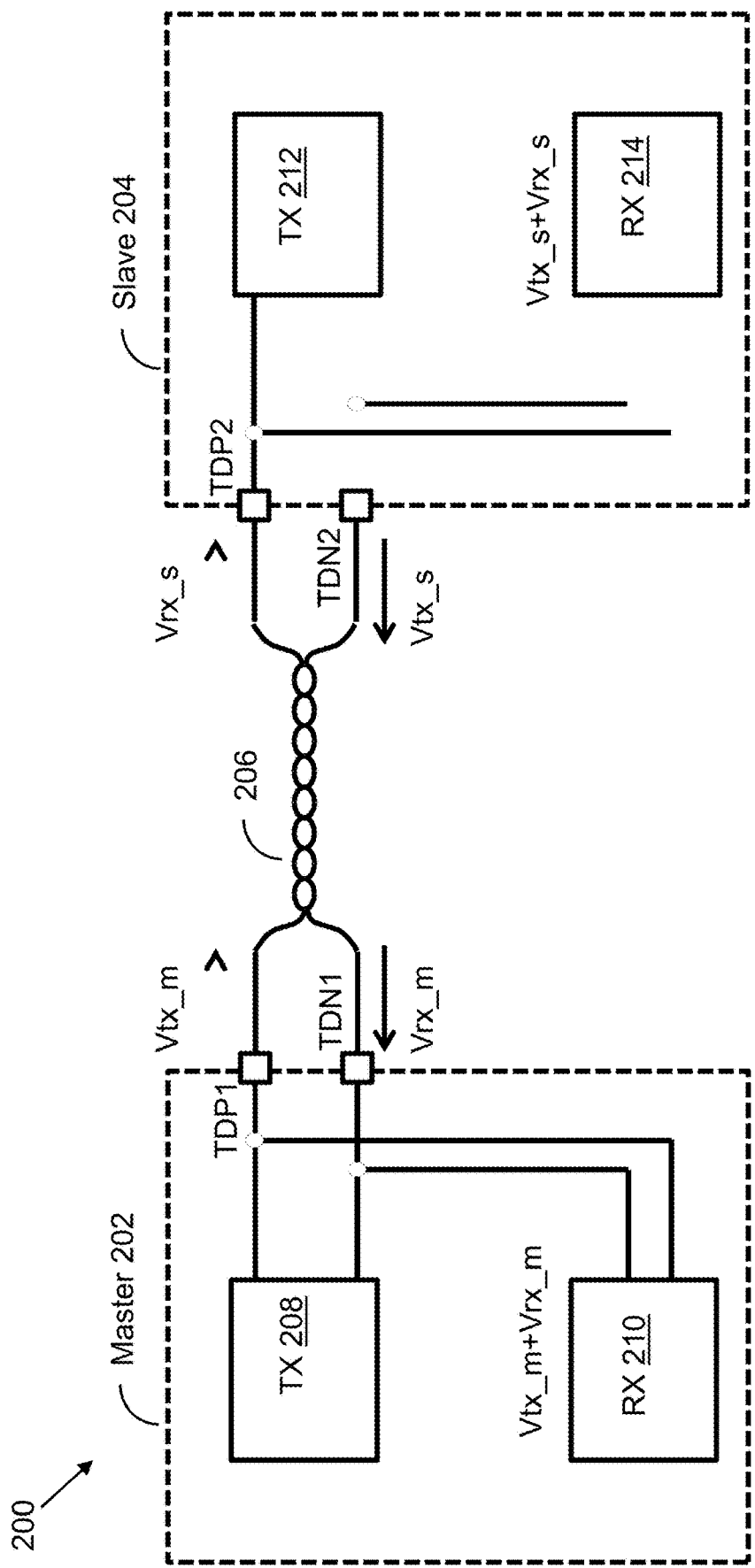
FIG. 2 is a block diagram depicting a communication system, in one or more embodiments.

Referring to FIG. 2, illustrated is a block diagram depicting a communication system 200, in one or more embodiments. The communication system 200 includes a transceiver pair including a master 202 and a slave 204 coupled to the master 202 through a network 206. The network 206 may be a twisted pair cable, an Ethernet cable, a coaxial cable, a triaxial cable, a wireless network, etc. The master 202 includes a port TDP1 coupled to a first port of the network 206 and a port TDN1 coupled to a second port of the network 206. The ports TDP1 and TDN1 may be referred to as Media Dependent Interface (MDI) pins. The slave 204 includes a TDP2 port coupled to a third port of the network 206 and a TDN2 port coupled to a fourth port of the network 206. The ports TDP2 and TDN2 may be referred to as partner MDI pins. In some embodiments, TDP1 is coupled (e.g. linked) to TDN1 through a first channel (e.g., wire) of the network 206. In some embodiments, TDP2 is coupled to TDN2 through a second channel of the network 206. In some embodiments, TDP1 and TDN1 are differential ports and TDP2 and TDN2 are differential ports.

The master 202 includes a transmitter (TX) 208 to provide (e.g., send, transmit) a transmit signal Vtx_m to the network

206. The TX 208 includes a first port coupled to TDP1 and a second port coupled to TDN1. In some embodiments, the first and second port of the TX 208 are differential ports configured to provide a differential signal to the network 206. The master 202 includes a receiver (RX) 210 to receive a receive signal Vrx_m from the network 206. The RX 210 includes a first port coupled to TDP1 and a second port coupled to TDN1. In some embodiments, the first and second port of the RX 210 are differential ports configured to receive a differential signal from the network 206.

The slave 204 includes a TX 212 to provide a transmit signal Vtx_s to the network 206. The TX 212 includes a first port coupled to TDP2 and a second port coupled to TDN2. In some embodiments, the first and second port of the TX 212 are differential ports configured to provide a differential signal to the network 206. The master 202 includes a RX 214 to receive a receive signal Vrx_s from the network 206. The RX 214 includes a first port coupled to TDP2 and a second port coupled to TDN2. In some embodiments, the first and second port of the RX 214 are differential ports configured to receive a differential signal from the network 206.

Figure 3:
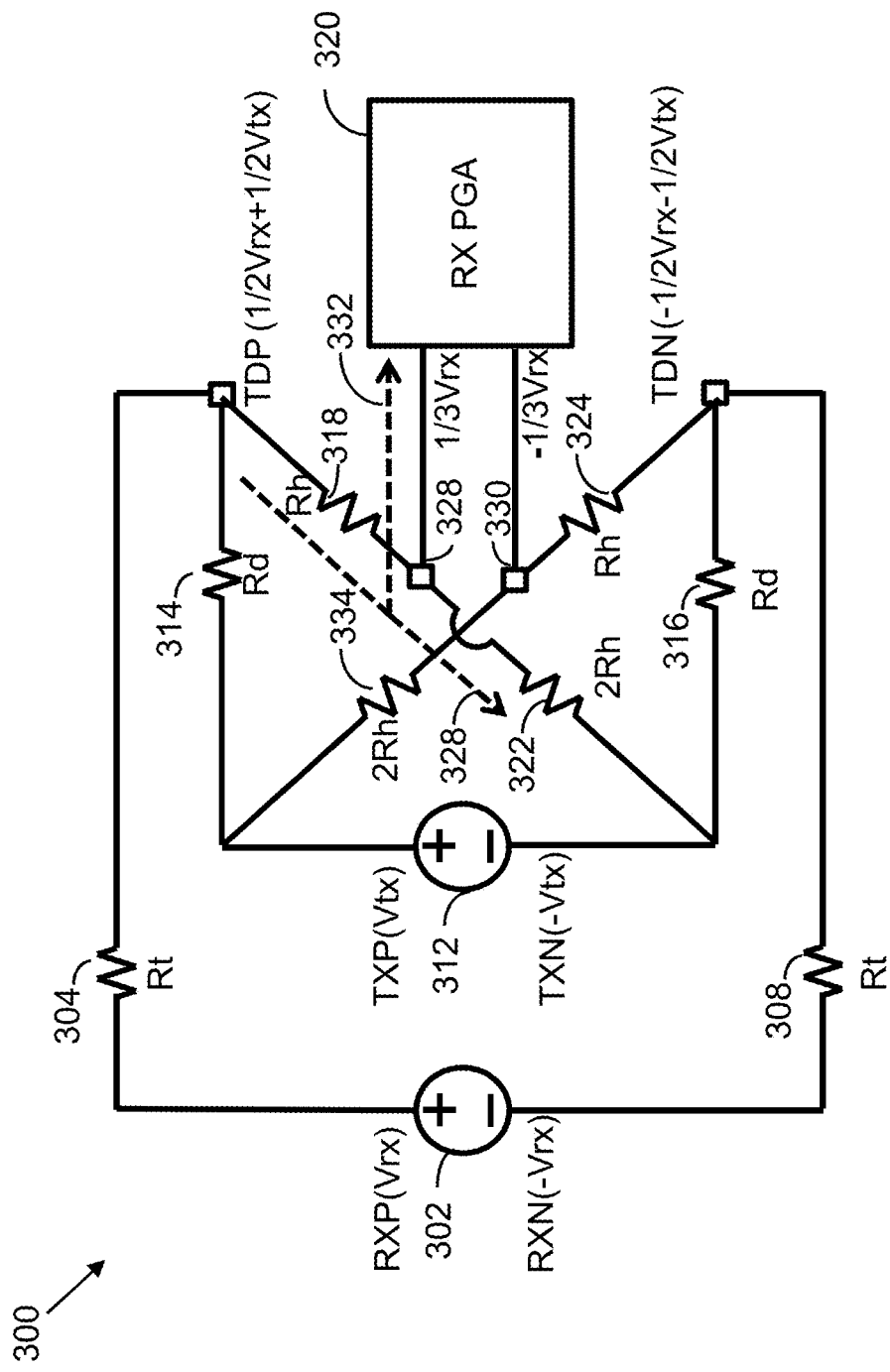
FIG. 3 is a circuit diagram depicting a hybrid circuit, according to some implementations.

Referring to FIG. 3, illustrated is a circuit diagram depicting a hybrid circuit 300 lacking the improved hybrid implementations described herein. A communication channel 302 provides a receive signal RXP having a voltage Vrx at a first output port and a receive signal RXN having a voltage—Vrx at a second output port. The hybrid circuit 300 includes a resistor 304 coupled to the first port of the communication channel 302 and having a resistance value Rt. The hybrid circuit 300 includes a resistor 308 coupled to the second port of the communication channel 302 and having a resistance value Rt.

A differential transmitter (TX) 312 provides a transmit signal TXP having a voltage Vtx at a first output port and a transmit signal TXN having a voltage—Vtx at a second output port. The hybrid circuit 300 includes a resistor 314 coupled to the first port of the TX 312 and having a resistance value Rd. The resistor 314 is coupled to the resistor 304 at a node TDP that couples the first output port of communication channel 302 and the first output port of the TX 312 (e.g., shared output port). The hybrid circuit 300 includes a resistor 316 coupled to the second port of the communication channel 302 and having a resistance value Rd. The resistor 316 is coupled to the resistor 308 at a node TDN that couples the second output port of communication channel 302 and the second output port of the TX 312.

The hybrid circuit 300 includes a resistor 318 coupled to TDP and having a resistance value Rh. The hybrid circuit 300 includes a receiver (RX) programmable gain amplifier (PGA) 320 having a first input port and a second input port. The first input port of the RX PGA 320 is coupled to the resistor 318 at a node 328. The hybrid circuit 300 includes a resistor 322 having a resistance value 2Rh and coupled between the node 328 and the second output port of the TX 312. The hybrid circuit 300 includes a resistor 324 coupled to TDP and having a resistance value Rh. The second input port of the RX PGA 320 is coupled to the resistor 324 at a node 330. The hybrid circuit 300 includes a resistor 326 having a resistance value 2Rh and coupled between the node 330 and the first output port of the TX 312.

The hybrid circuit 300 includes a network of resistor dividers. A first resistor divider includes 304 and 314. A second resistor divider includes 318 and 322. The first and second resistor dividers can remove Vtx at the node 328. The RX PGA 320 receives a fraction of Vrx as shown by line 332 but no Vtx as shown by line 334. Specifically, if Rd is equal to Rt for impedance matching, the 1:2 resistor ratio can completely remove the transmitter signal and deliver ⅔ Vrx at the receiver input.

Figure 4A:
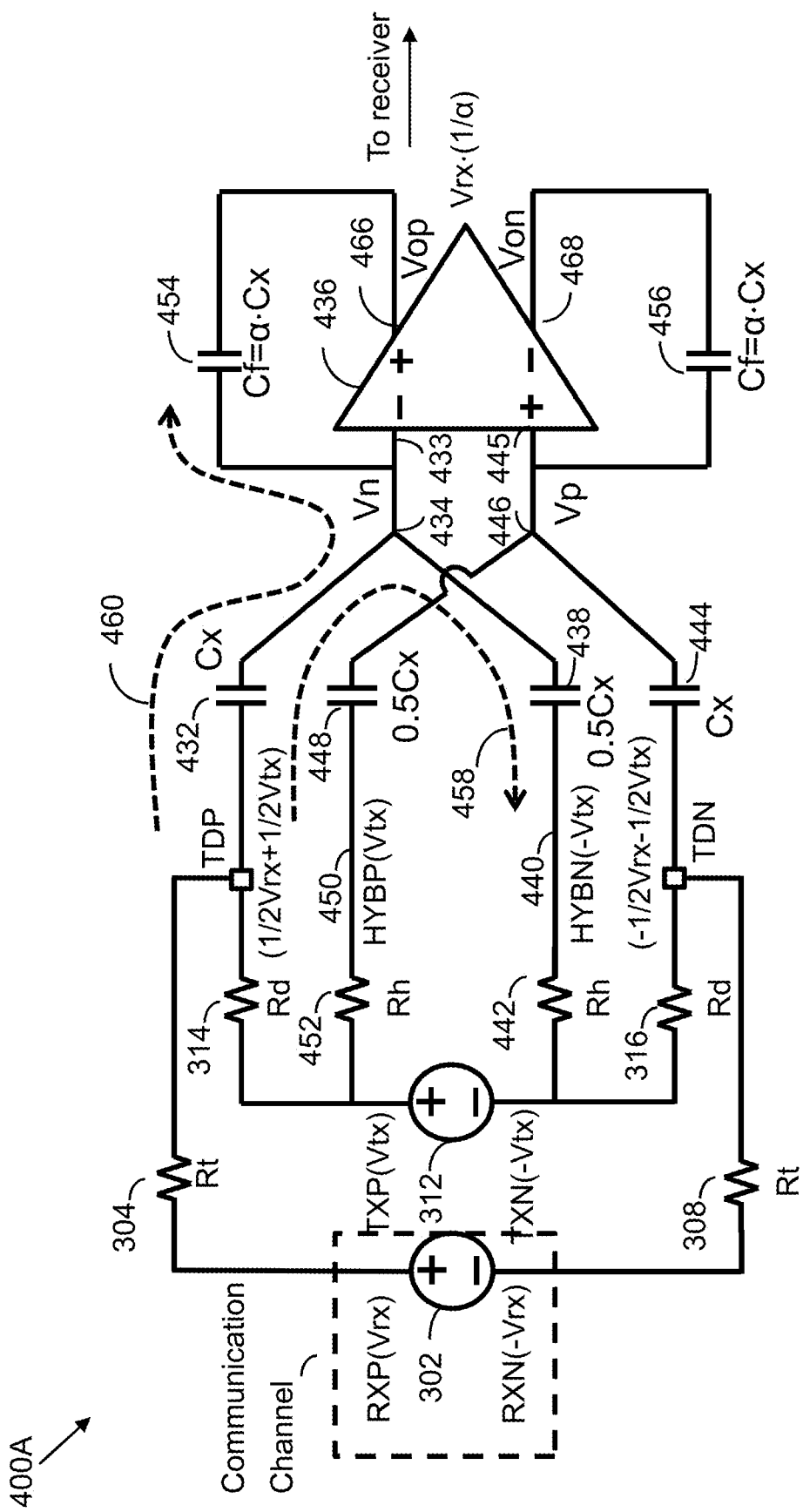
FIG. 4A is a circuit diagram depicting a hybrid circuit, in one or more embodiments.

Referring to FIG. 4A, illustrated is a circuit diagram depicting a hybrid circuit 400A, in one or more embodiments. A communication channel 302 (e.g., the network 206 of FIG. 2) provides a receive signal RXP having a voltage Vrx at a first output port and a receive signal RXN having a voltage—Vrx at a second output port. The hybrid circuit 400A includes a resistor 304 coupled to the first port of the communication channel 302 and having a resistance value Rt. The hybrid circuit 400A includes a resistor 308 coupled to the second port of the communication channel 302 and having a resistance value Rt.

A differential transmitter (TX) 312 (e.g., the TX 208 of FIG. 2) provides a transmit signal TXP having a voltage Vtx at a first output port and a transmit signal TXN having a voltage—Vtx at a second output port. The hybrid circuit 400A includes a resistor 314 coupled to the first port of the TX 312 and having a resistance value Rd. The resistor 314 is coupled to the resistor 304 at a node TDP that couples the first output port of communication channel 302 and the first output port of the TX 312 (e.g., shared output port). The hybrid circuit 400A includes a resistor 316 coupled to the second port of the communication channel 302 and having a resistance value Rd. The resistor 316 is coupled to the resistor 308 at a node TDN that couples the second output port of communication channel 302 and the second output port of the TX 312.

The hybrid circuit 400A includes a capacitor 432 coupled to TDP and having a capacitance value Cx. The hybrid circuit 400A an amplifier (e.g., RX PGA, operational amplifier, etc.) 436 having an input port 433, an input port 445, an output port 466, and an output port 468. The output ports 466 and 468 are coupled to an RX (e.g., the RX 210 of FIG. 2). In some embodiments, the RX includes the amplifier 436 (e.g., the amplifier 436 is referred to as a first stage of the RX). The input port 433 of the amplifier 436 is coupled to the capacitor 432 at a node 434. The hybrid circuit 400A includes a capacitor 438 having a value 0.5Cx and coupled between the node 434 and a node 440. The hybrid circuit 400A includes a resistor 442 having a value Rh and coupled between the node 440 and the second output of the TX 312.

The hybrid circuit 400A includes a capacitor 444 coupled to TDN and having a capacitance value Cx. The input port 445 of the amplifier 436 is coupled to the capacitor 444 at a node 446. The hybrid circuit 400A includes a capacitor 448 having a value 0.5Cx and coupled between the node 446 and a node 450. The hybrid circuit 400A includes a resistor 452 having a value Rh and coupled between the node 450 and the first output of the TX 312.

The hybrid circuit 400A includes a capacitor 454 having a value Cf coupled between the input port 433 of the amplifier 436 and the output port 466 of the amplifier 436. The hybrid circuit 400A includes a capacitor 456 having a value Cf coupled between the input port 445 of the amplifier 436 and the output port 468 of the amplifier 436. In some embodiments, Cf is equal to αCx, in which α is a coefficient.

The TX signal TXP is divided by a resistor network including resistors 304 and 314 to generate voltage of 0.5Vtx at TDP. A ratio of the capacitance values for the capacitors 432 and 438 can be selected such that no Vtx is at the node 434. In a case in which Rt is equal to Rd, the ratio can be 2. In such a configuration, current of the TX signal TXP flows according to the line 458. At higher frequencies in which the impedance of resistors dominate the frequency response, a second ratio of the resistance values for the resistors 314 and 442 can be selected such that no Vtx is at the node 434 at higher frequencies.

Due to a feedback configuration of the amplifier 436 (e.g., the capacitor 454 coupled between the output 466 and the input 433), the node 434 can be a virtual ground (e.g., to circuits outside the feedback amplifier 436, the node 434 has properties of ground). Accordingly, a current of the RX signal RXP may flow entirely, or substantially entirely, through the capacitor 454 to the output port 466. Likewise, none, or substantially none, of the RX signal RXP may flow to the second input port of the TX 312. The RX signal RXP can be amplified based on a ratio of the capacitors 432 and 454. For example, if the capacitance value of the capacitor 432 is Cx and the capacitance value of the capacitor 454 is αCx, then the RX signal RXP can be amplified from a voltage of Vrx/2 at the input port 433 of the amplifier 436 to a voltage of Vrx/2α at the output port 466 of the amplifier 436.

One or more elements between the first input of the communication channel 302 and the node TDP can be referred to as a first circuit. For example, the first circuit includes the resistor 304. One or more elements between the first input of the TX 312 and the node TDP can be referred to as a second circuit. For example, the second circuit includes the resistor 314. One or more elements between the node TDP and the node 434 can be referred to as a third circuit. For example, the third circuit includes the capacitor 432. One or more elements between the node 434 and the second input of the TX 312 can be referred to as a fourth circuit. For example, the fourth circuit includes the capacitor 438 and the resistor 442. One or more elements between the input 433 of the amplifier 436 and the output 466 of the amplifier can be referred to as a fifth circuit. For example, the fifth circuit includes the capacitor 454. The terms "first circuit," "second circuit," etc., may be interchangeable.

Figure 4B:
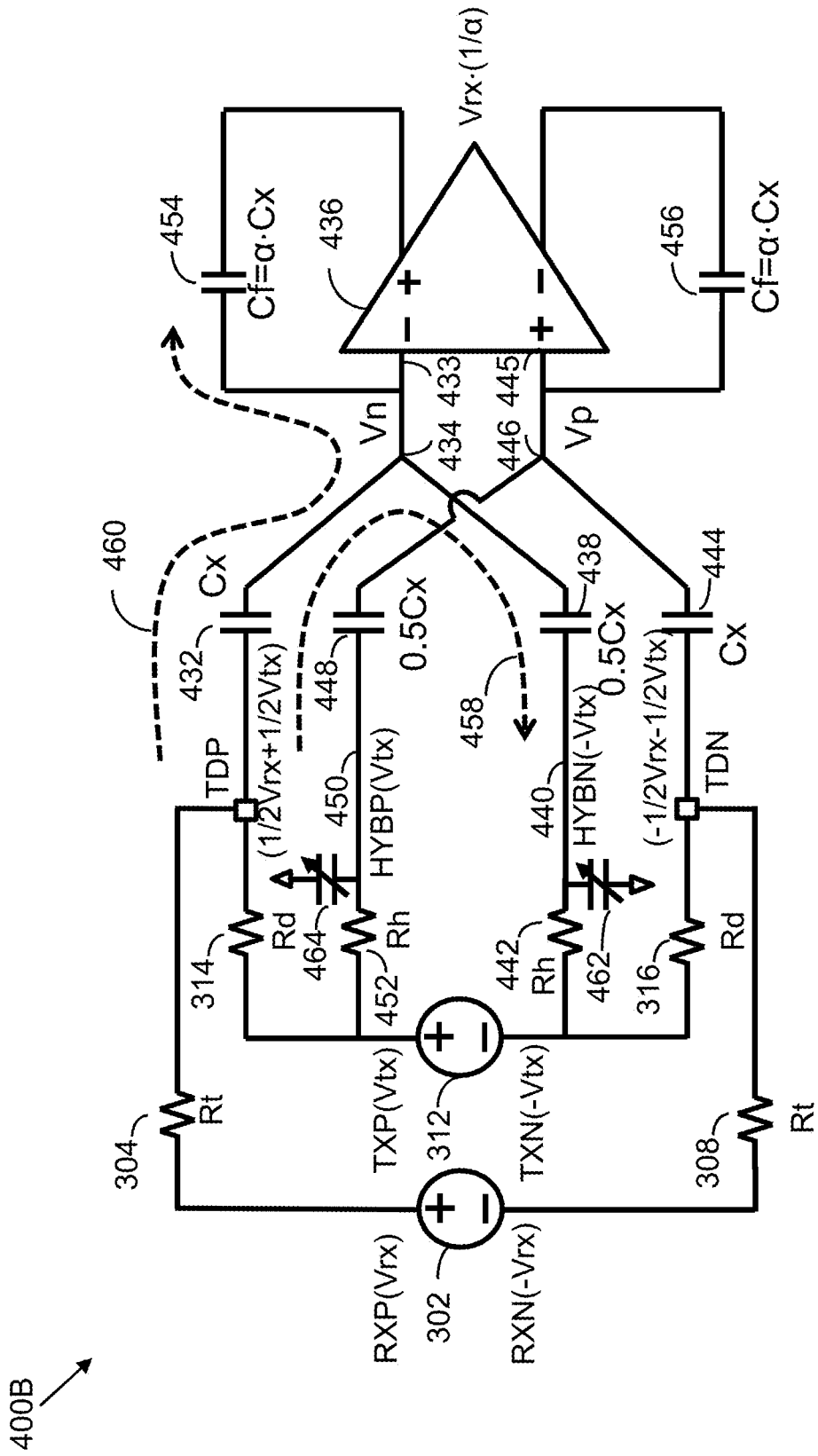
FIG. 4B is a circuit diagram depicting another hybrid circuit, in one or more embodiments.

Referring to FIG. 4B, illustrated is a circuit diagram depicting a hybrid circuit 400B, in one or more embodiments. The hybrid circuit 400B is similar to the hybrid circuit 400A except for the following differences. The hybrid circuit 400B includes a tunable capacitor 462 having a first port and a second port. The first port is coupled to the node 440. The second port is coupled to ground. The hybrid circuit 400B includes a tunable capacitor 464 having a first port and a second port. The first port is coupled to the node 450. The second port is coupled to ground.

In some embodiments, each of the tunable capacitors 462 and 464 include an array of capacitors. Each capacitor of the array of capacitors may be in series with a respective switch controlled by a control bit provided by a controller. In response to receiving the control bit in a first state, the switch may turn on (e.g., close, couple, enable, etc.), thereby enabling the respective capacitor. In response to receiving the control bit in a second state, the switch may turn off (e.g., open, decouple, disable, etc.), thereby disabling the respective capacitor.

Figure 4C:
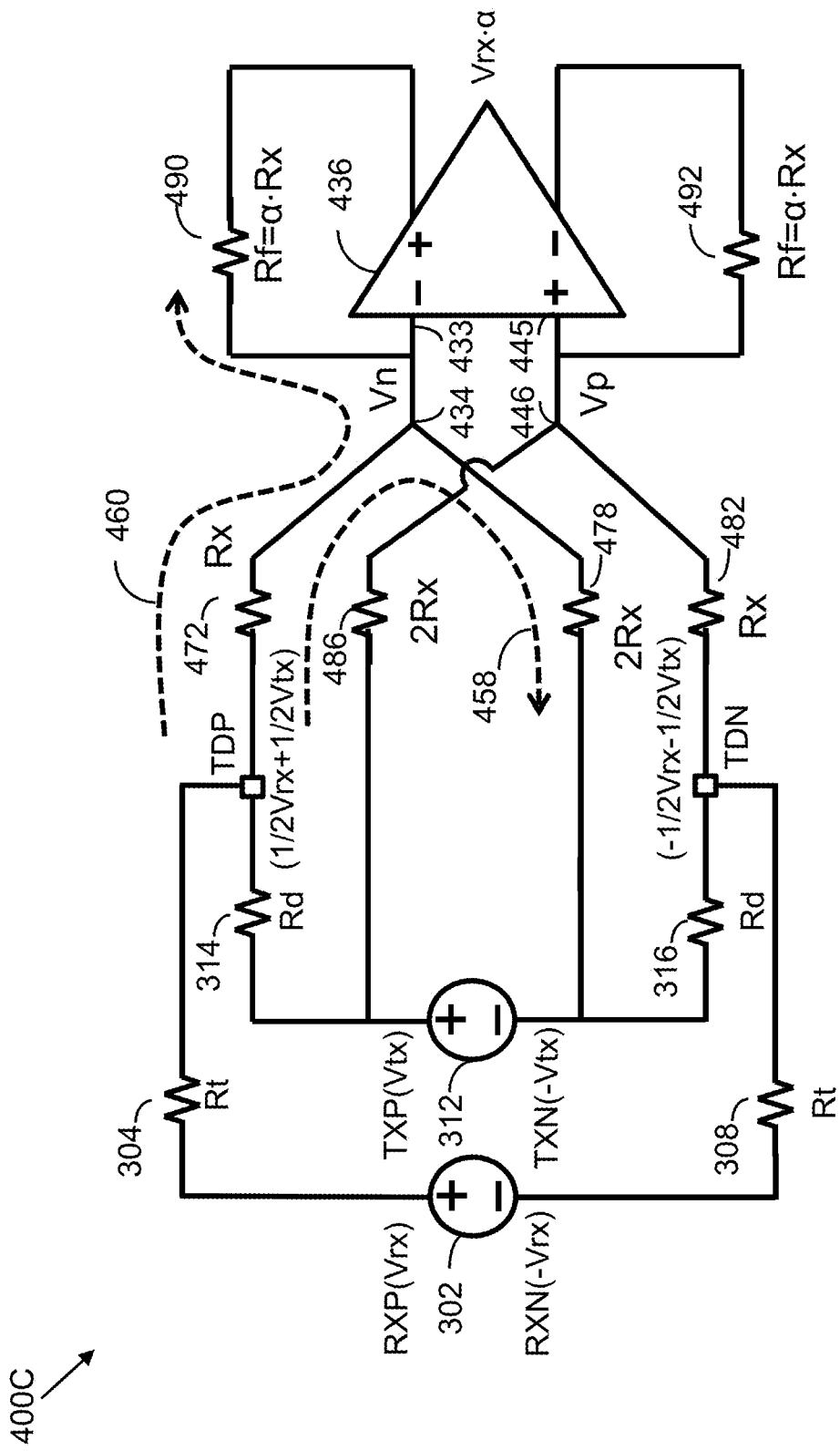
FIG. 4C is a circuit diagram depicting still another hybrid circuit, in one or more embodiments.

Referring to FIG. 4C, illustrated is a circuit diagram depicting a hybrid circuit 400C, in one or more embodiments. The hybrid circuit 400C is similar to the hybrid circuit 400A except for the following differences. In place of the capacitor 432, the hybrid circuit 400C includes a resistor 472 having a resistance value RX. In place of the capacitor 438 and the resistor 442, the hybrid circuit 400C includes a resistor 478 having a resistance value 2RX. In place of the capacitor 444, the hybrid circuit 400C includes a resistor 482 having a resistance value RX. In place of the capacitor 448 and the resistor 452, the hybrid circuit 400C includes a resistor 486 having a resistance value 2RX. In place of the capacitor 454, the hybrid circuit 400C includes a resistor 490 having a resistance value Rf. In place of the capacitor 456, the hybrid circuit 400C includes a resistor 492 having a resistance value Rf. In some embodiments, Rf=a*RX.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A hybrid network for use in a full duplex communication system, wherein the hybrid network comprises:
    a first circuit coupled between an output of a communication channel and a node between a transmitter and the communication channel;
    a second circuit comprising a first resistor having a first resistance coupled between a first output of the transmitter and the node;
    a third circuit coupled between the node and an input of an amplifier;
    a fourth circuit comprising a second resistor having a second resistance coupled between the input of the amplifier and a second output of the transmitter, wherein the hybrid network is configured to use a second transmit signal from the second output of the transmitter to cancel a first transmit signal from the first output of the transmitter based at least on the first resistance and the second resistance; and
    a fifth circuit coupled between an output of the amplifier and the input of the amplifier, wherein the output of the amplifier is coupled to an input of a receiver.

2. The hybrid network of claim 1, wherein the hybrid network is configured to:
    provide, to the receiver, a receive signal provided by the output of the communication channel.

3. The hybrid network of claim 1, wherein the fifth circuit includes a first capacitor.

4. The hybrid network of claim 1, wherein:
    the third circuit includes a first capacitor having a first capacitance; and
    the fourth circuit includes a second capacitor having a second capacitance.

5. The hybrid network of claim 4, wherein the hybrid network is configured to use the second transmit signal from the second output of the transmitter to cancel the first transmit signal from the first output of the transmitter based further on a ratio of the first capacitance and the second capacitance.

6. The hybrid network of claim 5, wherein:
the second circuit includes the first resistor having the first resistance and coupled to the first capacitor; and
the fourth circuit includes the second resistor having the second resistance and coupled to the second capacitor.

7. The hybrid network of claim 6, wherein the hybrid network is configured to use the second transmit signal from the second output of the transmitter to cancel the first transmit signal from the first output of the transmitter based on a second ratio of the first resistance and the second resistance.

8. The hybrid network of claim 6, wherein the fourth circuit includes a tunable capacitor coupled at one end between the second capacitor and the second resistor and coupled at a second end to a ground.

9. The hybrid network of claim 6, wherein the first circuit includes a third resistor having a third resistance equal to the first resistance, and coupled to the first capacitor.

10. The hybrid network of claim 6, further comprising:
a sixth circuit coupled between a second node and a second input of the amplifier; and
a seventh circuit coupled between the second input of the amplifier and the first output of the transmitter, wherein the sixth circuit includes a third capacitor, and the fourth circuit includes a fourth capacitor.

11. The hybrid network of claim 1, wherein the fifth circuit includes a third resistor.

12. The hybrid network of claim 1, wherein:
the third circuit includes a third resistor having a third resistance.

13. The hybrid network of claim 12, wherein the hybrid network is configured to use the second transmit signal from the second output of the transmitter to cancel the first transmit signal from the first output of the transmitter based further on a ratio of the third resistance and the second resistance.

14. A hybrid network for use in a full duplex communication system, wherein the hybrid network comprises:
a first circuit comprising a first resistor having a first resistance coupled between a first output of a transmitter and a node of the transmitter and a communication channel;
a second circuit coupled between the node and an input of an amplifier, wherein the second circuit includes a first capacitor;
a third circuit comprising a second resistor having a second resistance coupled between the input of the amplifier and a second output of the transmitter, wherein the third circuit includes a second capacitor, wherein the hybrid network is configured to use a second transmit signal from the second output of the transmitter to cancel a first transmit signal from the first output of the transmitter based at least on the first resistance and the second resistance; and
a fourth circuit coupled between an output of the amplifier and the input of the amplifier, wherein the output of the amplifier is also coupled to a receiver.

15. The hybrid network of claim 14, wherein the hybrid network is configured to:
provide, to the receiver, a receive signal provided by the communication channel.

16. The hybrid network of claim 14, wherein the fourth circuit includes a third capacitor.

17. The hybrid network of claim 14, wherein:
the first capacitor has a first capacitance; and
the second capacitor has a second capacitance, wherein the hybrid network is configured to use the second transmit signal from the second output of the transmitter to cancel the first transmit signal from the first output of the transmitter further based on a ratio of the first capacitance and the second capacitance.

18. The hybrid network of claim 17, wherein:
the first circuit includes the first resistor coupled to the first capacitor; and
the third circuit includes the second resistor and coupled to the second capacitor.

19. The hybrid network of claim 18, wherein the hybrid network is configured to use the second transmit signal from the second output of the transmitter to cancel the first transmit signal from the first output of the transmitter based on a second ratio of the first resistance and the second resistance.

20. The hybrid network of claim 18, wherein the third circuit includes a tunable capacitor coupled at one end between the second capacitor and the second resistor and coupled at a second end to ground.

21. A device, comprising:
a first resistor coupled between an output of a communication channel and a node between a transmitter and the communication channel;
a second resistor having a first resistance coupled between a first output of the transmitter and the node;
a first capacitor coupled between the node and an input of an amplifier;
a second capacitor and a third resistor having a second resistance coupled between the input of the amplifier and a second output of the transmitter, wherein the device is configured to use a second transmit signal from the second output of the transmitter to cancel a first transmit signal from the first output of the transmitter based at least on the first resistance and the second resistance; and
a third capacitor coupled between an output of the amplifier and the input of the amplifier, wherein the output of the amplifier is coupled to an input of a receiver.

22. The device of claim 21, wherein:
the first capacitor has a first capacitance; and
the second capacitor has a second capacitance,
wherein the device is configured to use a second transmit signal from the second output of the transmitter to cancel a first transmit signal from the first output of the transmitter based further on a ratio of the first capacitance and the second capacitance.

23. The device of claim 21, comprising:
the third resistor coupled between the second output of the transmitter and the second capacitor,
wherein:
the device is configured to use the second transmit signal from the second output of the transmitter to cancel the first transmit signal from the first output of the transmitter based on a ratio of the first resistance and the second resistance.

* * * * *